United States Patent

[11] 3,582,761

| | | |
|---|---|---|
| [72] | Inventor | Berti F. Hall, Jr.<br>3568 Kipling Road, Berkley, Mich. 48072 |
| [21] | Appl. No. | 681,738 |
| [22] | Filed | Nov. 9, 1967 |
| [45] | Patented | June 1, 1971 |

[54] THERMOCOUPLE CONVERTOR
13 Claims, 7 Drawing Figs.

[52] U.S. Cl. .................................................... 322/2, 73/360, 73/361
[51] Int. Cl. ...................................................... G01k 5/72
[50] Field of Search .......................................... 322/2; 324/105, 106, 74, 115; 73/1 F, 361, 359, 360

[56] References Cited
UNITED STATES PATENTS

| | | | |
|---|---|---|---|
| 2,876,417 | 3/1959 | Winram | 73/(1F)X |
| 3,085,436 | 4/1963 | Huddleston, Jr. | 73/361 |
| 3,270,547 | 9/1966 | MacRitchie et al. | 73/(1F) |
| 3,280,630 | 10/1966 | Latham, Jr. | 73/361 |
| 3,327,517 | 6/1967 | Huffman | 73/(1F) |

OTHER REFERENCES

Millman, Jacob and Taub, Herbert, "Pulse and Digital Circuits, McGraw-Hill, 1956 pp. 22—24 copy in GR. 211

Savant, Jr.; C. J., "Control System Design, McGraw-Hill 1964, p. 287 copy in GR. 211

*Primary Examiner*—Oris L. Rader
*Assistant Examiner*—H. Huberfeld
*Attorney*—Harness, Dickey and Pierce

ABSTRACT: Apparatus for converting thermocouple output of one type thermocouple to simulate the output of a different type thermocouple and including voltage divider apparatus to be connected across the one type thermocouple for multiplying the output of that thermocouple in accordance with a preselected ratio whereby its output will simulate that of the different type thermocouple.

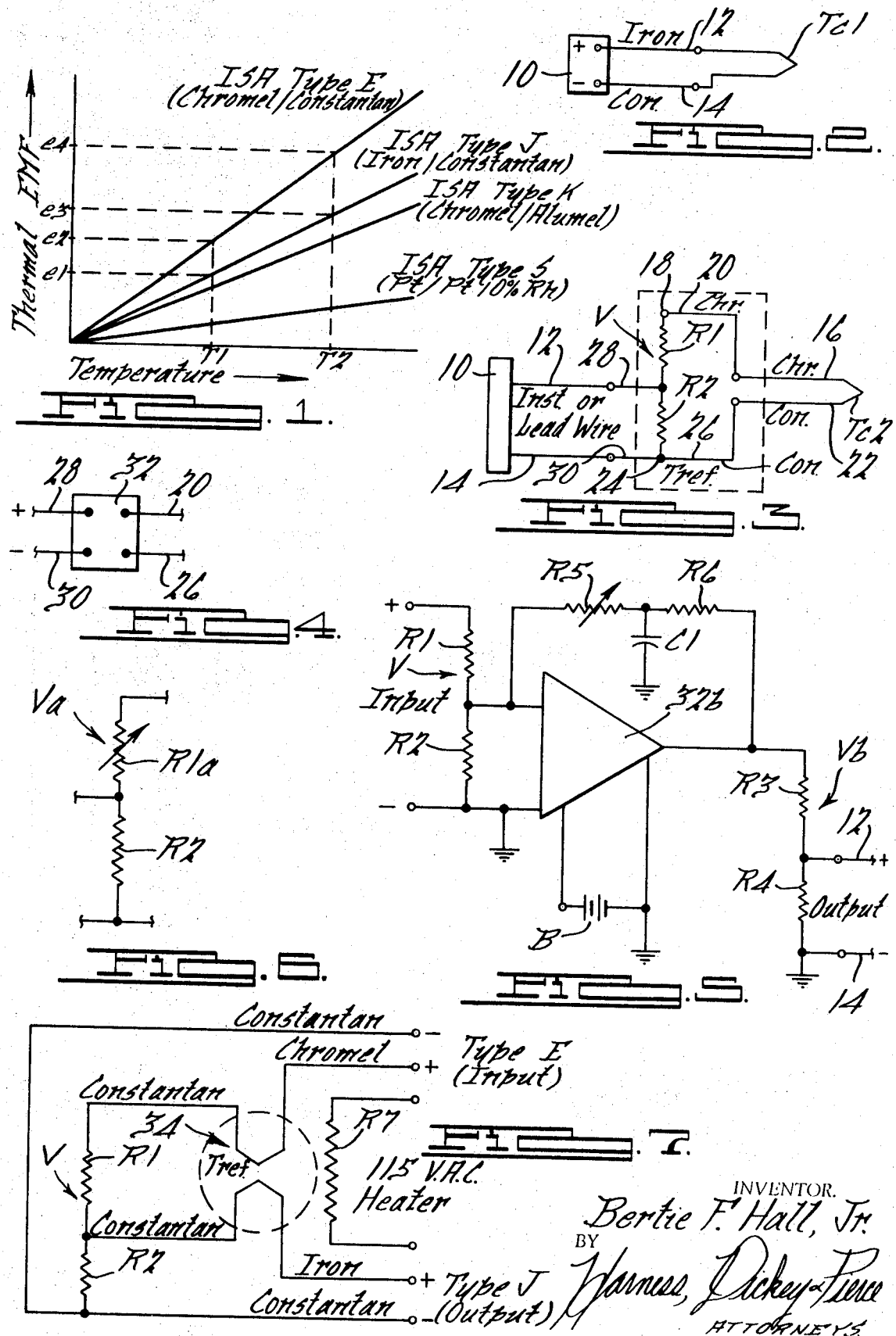

THERMOCOUPLE CONVERTOR

This invention relates to apparatus for converting the output from one thermocouple having a first calibration to that of another thermocouple having a different calibration.

The device of the present invention may be used with existing thermocouple instrumentation and installed lead wire systems and permits the use of thermocouple sensors of a calibration different than that for which the installation was designed.

This is particularly useful in established industrial facilities in which it is desirable to use newer and/or different thermocouple sensors. This is especially true in industrial installation where the common iron-constantan combination is being used in high-temperature applications and where frequent replacement is required because of corrosion of the iron. In many cases, oxidation of the iron causes breakup of the insulators and jamming of the thermocouple in the protection tube and can require an unusually expensive replacement. A more corrosion resistant type of thermocouple material would be desirable but the long runs of lead wire installed to carry the signal to the instrument, the extensive conduit systems involved and the character of the existing instrumentation make it impractical to convert the entire system to a different thermocouple.

The present invention provides a solution to this problem by permitting the installation of a different type of thermocouple and modifying the output picked up by the existing lead wire so that the instrument will indicate the correct temperature as though a thermocouple of the replaced type were being used to generate the signal.

Thus, the present invention bridges the gap between thermocouple type and instrument calibration.

In addition, when a direct indication of temperature is required, the instrument scale and chart paper printing (in case of recorders) must coincide with the calibration of temperature and output voltage of the particular thermocouple to be used. The instrument is intended for use only with that particular type of thermocouple and use of a different type would normally result in substantial errors in temperature indication. With the apparatus of the present invention an interchangeability of thermocouple type is permitted whereby the output as picked up by the lead wire and transmitted to the instrument will be the same despite the use of different types of thermocouples.

Therefore, it is an object of the present invention to provide apparatus for converting the output of one thermocouple type into the same output as provided by a different thermocouple type.

It is a general object of the present invention to provide an improvement in pyrometric measuring devices.

Other objects, features, and advantages of the present invention will become apparent from the subsequent description and the appended claims, taken in conjunction with the accompanying drawings, in which:

FIG. 1 is a series of curves showing the relationship of thermal e.m.f. vs. temperature for various thermocouple types;

FIG. 2 is a schematic drawing of a conventional thermocouple installation;

FIG. 3 is a schematic drawing depicting a thermocouple installation utilizing one form of the present invention;

FIG. 4 is a schematic drawing showing a different form of the present invention;

FIG. 5 is a schematic drawing showing a modification of the form of FIG. 4;

FIG. 6 is a schematic drawing showing a modification of the form of FIG. 3; and

FIG. 7 is a schematic drawing showing an improved version of the form of FIG. 3.

The operation of the present invention can be understood from the following description. In the selection of materials for use as thermocouple elements it is desirable that the thermal e.m.p. vary with temperature in a linear fashion. Most of the commercially applied types approach linearity of their output vs. temperature characteristics. Thus, a nearly constant proportionality exists between the outputs of the several thermocouple types (see FIG. 1) which generally illustrates the outputs of common thermocouple types.

In FIG. 2 a typical thermocouple installation is illustrated and includes a thermocouple $Tc1$ of type J (iron/constantan) which is connected to an instrument generally indicated by the numeral 10 by lead wires 12 and 14. For an iron/constantan thermocouple, lead wires 12 and 14 are preferably iron and constant, respectively (or some other lead wire materials compatible with iron/constantan). As previously noted, there are many instances in which it would be desirable to use a different thermocouple type still using, however, the same lead wires 12 and 14.

In FIG. 3 a converter is shown whereby the output of one type of thermocouple may be modified by use of a voltage divider and result in a secondary output essentially equivalent to that of one of the other types. A thermocouple $Tc2$ of the chromel/constantan type is shown connected to a voltage divider V comprising serially connected resistors R1 and R2. The chromel wire 16 is connected to point 18 at one end of voltage divider V via a chromel lead wire 20 while the constantan wire 22 is connected to point 24 at the opposite end via a constantan lead wire 26. Iron lead wire 28 and constantan lead wire 30 are connected across the resistor R2 and in turn are connected to instrument lead wires 12 (iron) and 14 (constantan), respectively, which connect to instrument 10. The ratio of R2 to the sum of R1 and R2 is selected such that the instrument 10 receives an output signal from the thermocouple $Tc2$ via divider V2 which is substantially the same as that previously received directly from thermocouple $Tc1$. Looking to FIG. 1 and considering the substitution of the type E (chromel/constantan) for the type J (iron/constantan) thermocouple, the ratio of $R2/R1+R2$ will be selected to be equal to $e1/e2$, $e3/e4$, etc. In the apparatus of FIG. 2 the output from thermocouple $Tc1$ to the instrument 10 will be independent of the ambient temperature of the lead wires 12 and 14 at their connection to thermocouple $Tc1$. In FIG. 3, however, the instrument lead wires 10 and 12 at the divider V will provide an output corresponding to the ambient temperature while the thermocouple $Tc2$ will provide an output relative to ambient (due to the junction of conductor 16 (chromel) and conductor 20 (constantan) which is similar to the junction of $Tc2$). The output from thermocouple $Tc2$, however, by virtue of divider V will provide an adjusted output (across R2) equal to an iron/constantan thermocouple relative to ambient. The sum of the instrument lead wire (12, 14) output and of the adjusted relative output will be substantially equal to the output from the thermocouple $Tc1$ of FIG. 2 and, hence, instrument 10 will see substantially the same potential in either case.

As a result the existing lead wire 12, 14 and instrumentation 10 can still be used saving costly replacement. With a voltage divider, substitutions of thermocouple types are permitted where the replacement thermocouple has a higher output voltage to temperature ratio than the original or replaced thermocouple. In instances where a replacement having a lower ratio is desired a voltage amplifier 32 (see FIG. 4) could be used in place of the divider V of FIG. 3. Amplifier 32, alternatively and/or additionally, could be a current amplifier and used with or without divider V in applications in which the instrument 10 was of the type requiring current of a substantial magnitude for operation; in this latter situation the amplifier 32 would minimize the current required from thermocouple $Tc2$ and, hence, minimize errors due to voltage drops across the instrument lead wires and voltage divider.

A voltage divider and current amplifier combination are generally shown in FIG. 5. Here voltage divider V has R2 connected to the input of amplifier $32b$ which has a second voltage divider $Vb$ at its output. Voltage divider $Vb$ comprises serially connected resistors R3 and R4 with resistor R4 being connected to instrument lead wires 12 and 14. The ratio of R1 to R2 is set equal to the ratio of R3 to R4. With amplifier $32b$, large values of R1 and R2 can be used whereby current flow from the associated thermocouple is minimized and hence voltage drop errors are minimized. The resistors R3 and R4, however, can be selected to be of relatively smaller magnitudes, i.e. R1 substantially greater than R3, whereby the instrument 10 will see a low source impedance whereby an advantageous impedance match can be attained. In FIG. 5 a pair of serially connected resistors R5 and R6 connect the output of amplifier 32b to its input and define a feedback loop; R5 is variable whereby the gain can be selectively varied. A bypass capacitor C is connected from the juncture of R5 and R6 to ground. The amplifier 32b is energized by a source of DC potential indicated as battery B.

While the curves of FIG. 1 depict the voltage-temperature relationship as being linear there is generally some degree of nonlinearity especially at lower temperatures, i.e. below around 400° F. Since the apparatus of FIG. 3 is sensitive to ambient temperature variations some error may occur as a result of the nonlinearity of the thermocouple at these low temperatures. This error can be minimized by using, in divider V$a$, a resister R1$a$ for R1 (see FIG. 6) such that its resistance changes with changes in ambient temperature in a manner to compensate for the nonlinearity of the thermocouple.

As noted the output of thermocouples are substantially linear at elevated temperatures, i.e. around 400° F. and higher; in another form of the invention the nonlinearity is minimized by locating the reference junctions at the divider V in an oven or proximate to some heating apparatus whereby the temperature of these junctions is raised to around 400° F. FIG. 7 is similar to FIG. 3 with the addition of a heater 34 which can be a resistance element R7 adapted to be connected to a source of electrical power. The junctions between leads 16 (chromel) and 20 (constantan) and leads 12 (iron) and 28 (constantan) are heated by heater 34 via element R7. Note that it is not required that the temperature of heater 34 be accurately controlled since, as previously noted, the output at lead wires 10 and 12 will still be a potential corresponding to temperature measured by thermocouple T$c$2.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What I claim is:

1. For a thermocouple installation having lead wires adapted to be connected to a first thermocouple of a first type, a converter for converting the output of a second thermocouple of a second type into the output of the first thermocouple comprising: circuit means adapted to be connected between the second thermocouple and the lead wires for the first thermocouple, said circuit means comprising multiplying means for multiplying the output of the second thermocouple in accordance with a preselected ratio whereby the output appearing at the input of the lead wires will appear to be generally the same as when the first thermocouple was connected to the lead wires.

2. The apparatus of claim 1 with said multiplying means comprising a voltage divider.

3. The apparatus of claim 2 with said voltage divider comprising a pair of serially connected resistors with said multiplying means including connecting means for electrically connecting the second thermocouple across said pair of resistors and for electrically connecting the lead wires across one of said resistors.

4. The apparatus of claim 3 with said connecting means forming a thermocouple junction similar to that of the second thermocouple.

5. The apparatus of claim 3 with one of said resistors being preselected to have a resistivity and hence resistance varying with temperature whereby inaccuracies in the output of said voltage divider due to ambient temperature changes is minimized.

6. The apparatus of claim 1 further including heating means for heating selected junctions formed in connecting the second thermocouple and lead wires to said multiplying means to a preselected temperature at which the response to said selected junctions is more nearly linear when compared to their response at ambient.

7. The apparatus of claim 2 with said multiplying means including connecting means for electrically connecting the second thermocouple and the lead wires to said voltage divider, said connecting means forming thermocouple junctions in electrically connecting the second thermocouple and the lead wires to said voltage divider, and heating means for heating said thermocouple junctions to a preselected temperature at which the response of said thermocouple junctions is more nearly linear when compared to their response at ambient.

8. The apparatus of claim 1 with said multiplying means comprising amplifying means for amplifying the output from the second thermocouple.

9. The apparatus of claim 8 with said amplifying means being a current amplifier.

10. The apparatus of claim 8 with said amplifying means being a voltage amplifier.

11. The apparatus of claim 2 with said voltage divider comprising a pair of serially connected resistors, said multiplying means including current amplifying means and further including connecting means for electrically connecting the second thermocouple across said pair of resistors, for electrically connecting said resistors to the input of said amplifying means, and for electrically connecting the output of said amplifying means to the lead wires.

12. The apparatus of claim 11 with said amplifying means having a low output impedance relative to the impedance of said voltage divider.

13. For a thermocouple installation having lead wires adapted to be connected to a first thermocouple of a first type and to an indicating device for providing an indication of temperature variations of the first thermocouple, a converter for converting to the indicating device the output of a second thermocouple of a second type into the output of the first thermocouple comprising: circuit means adapted to be connected to the second thermocouple and, the lead wires for the first thermocouple and the indicating device, said circuit means comprising multiplying means for multiplying the output of the second thermocouple in accordance with a preselected ratio whereby the output appearing at the input of the indicating device will appear to be generally the same as when the first thermocouple was connected to the lead wires.

PO-1050
(5/69)

UNITED STATES PATENT OFFICE
CERTIFICATE OF CORRECTION

Patent No. 3,582,761     Dated June 1, 1971

Inventor(s) Bertie F. Hall, Jr.

It is certified that error appears in the above-identified patent and that said Letters Patent are hereby corrected as shown below:

Title page, line 1, "Berti" should be --Bertie--
Column 1, line 42, "lead wire should be --lead wires--
Column 1, line 73, "e.m.p." should be --electromotive force--
Column 2, line 9, "constant" should be --constantan--

Signed and sealed this 26th day of October 1971.

(SEAL)
Attest:

EDWARD M. FLETCHER, JR.
Attesting Officer

ROBERT GOTTSCHALK
Acting Commissioner of Patents